(12) United States Patent
Shepherd et al.

(10) Patent No.: US 9,394,504 B1
(45) Date of Patent: Jul. 19, 2016

(54) STOVETOP EXTRACTION APPARATUS AND METHOD FOR RENDERING INFUSED LIPIDS FOR INGESTION

(71) Applicants: Brandon Shepherd, Aurora, CO (US); Seth Cox, Westminster, CO (US); Victor Battin, Tucson, AZ (US)

(72) Inventors: Brandon Shepherd, Aurora, CO (US); Seth Cox, Westminster, CO (US); Victor Battin, Tucson, AZ (US)

( * ) Notice: Subject to any disclaimer, the term of this patent is extended or adjusted under 35 U.S.C. 154(b) by 0 days.

(21) Appl. No.: 14/634,749

(22) Filed: Feb. 28, 2015

Related U.S. Application Data

(60) Provisional application No. 61/946,026, filed on Feb. 28, 2014.

(51) Int. Cl.
| | |
|---|---|
| A61L 2/00 | (2006.01) |
| F26B 21/06 | (2006.01) |
| A47J 37/12 | (2006.01) |
| C10B 1/00 | (2006.01) |
| F22B 1/30 | (2006.01) |
| C11B 1/10 | (2006.01) |
| B01D 11/02 | (2006.01) |
| A23D 7/02 | (2006.01) |

(52) U.S. Cl.
CPC ... *C11B 1/10* (2013.01); *A23D 7/02* (2013.01); *B01D 11/0296* (2013.01)

(58) Field of Classification Search
CPC ........ F22B 1/284; A61L 2/20; A61K 2300/00
USPC .............. 422/26, 292, 299–300, 308; 34/540, 34/543; 202/83, 106; 99/326, 403, 451, 99/467; 392/324
See application file for complete search history.

(56) References Cited

U.S. PATENT DOCUMENTS

2005/0238338 A1* 10/2005 Chan ...................... A23B 4/052
392/324

* cited by examiner

*Primary Examiner* — Monzer R Chorbaji
(74) *Attorney, Agent, or Firm* — Williams Intellectual Property; Benjamin F. Williams

(57) ABSTRACT

A stovetop extraction apparatus and method for rendering infused lipids for ingestion in the home including a base compartment, an insertable portion seatable into the base compartment, and an upper compartment having an internal chamber disposed in open communication with a column projecting into the upper compartment, wherein lipids and water dispositional interior to the base compartment are heatable upon a stovetop, said lipids thereby conveyable, by action of saturated steam producible interior to the base compartment, across substrate disposed in the insertable portion, into the internal chamber, up the column, and thereby collectable in the upper compartment separate from the substrate, whereby substrates dispositional interior to the insertable portion are subject to extraction of lipophilic substances therefrom and infused lipids are thereby rendered collectable in the upper compartment for use in subsequent culinary or medicinal preparations.

8 Claims, 6 Drawing Sheets

STOVETOP EXTRACTION APPARATUS AND METHOD FOR RENDERING INFUSED LIPIDS FOR INGESTION

CROSS-REFERENCE TO RELATED APPLICATIONS

This nonprovisional application claims the benefit of provisional application No. 61/946,026 filed on Feb. 28, 2014.

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of extraction apparatuses and methods for stovetop rendering of infused lipids for ingestion are known in the art. However, most fail to maximize lipophilic extraction by maintaining lipid and substrate contact while continually heating, is whereby equilibrium is reached and lipophilic substances may be exchanged back into the substrate, reducing concentration of the infused lipid product. Moreover temperatures may be reached by action of direct heating upon the lipids whereby lipids may boil or burn, and lipophilic extracts become denatured or impotent.

What is needed is a stovetop extraction apparatus and method for rendering infused lipids for ingestion in the home that includes a base compartment attachable to an upper compartment, said upper compartment having an internal chamber therein, wherein a substrate positional in an upper receptacle of an insertable portion is maintainable disposed in-flow of saturated steam and exposed to lipid droplets borne by said steam; said steam forced along a pressure gradient by action of heat applied to the base compartment to pass over said substrate and condense in the upper compartment separated from the substrate; whereby lipids are continuously borne over the substrate to effect lipophilic extraction of lipophilic substances from said substrate, and are thence collectable in the upper chamber. A concentration gradient is thereby maintained at the interface of substrate and lipids while lipids are continuously introduced over said substrate and collected removed from said substrate, whereby lipophilic extraction is maximized and temperature throughout is controlled at the boiling point of water by production of saturated steam to prevent denaturation of lipophic extractants. The present stovetop extraction apparatus for rendering infused lipids for ingestion is expediently erectable for use, and readily operable in the home or kitchen to effect high concentration infused lipids for use in culinary and medicinal preparations.

FIELD OF THE INVENTION

The present invention relates to a stovetop extraction apparatus and method for rendering infused lipids for ingestion, and more particularly, to a stovetop extraction apparatus and method for rendering infused lipids for ingestion in the home or kitchen that includes a base compartment releasably connectable to an upper compartment, said base compartment having an open top end girded by an upper rim threadably connectable to a lowermost end of the upper compartment, wherein an insertable portion seats into the open top end to situate an upper receptacle in position underlying a porous boundary disposed transversely sectioning the upper compartment proximal the lowermost end, and substrate dispositional within the upper receptacle is sealably enclosable for extraction of lipophilic substances when lipids, additional to the base compartment, are heated with water to produce saturated steam, whereby lipid droplets are dispersed and borne in the saturated steam along a pressure gradient across the substrate, whereat a concentration gradient is maintained for diffusion of lipophilic substances out of said substrate, and subsequently infused lipids are forcible up an elongate column for collection as emulsion with condensate interior to the upper compartment separated from the substrate, the emulsion subsequently coolable to solidify the rendered ad infused lipids separate from the water, thereby producing infused lipids appropriate for use in culinary and medicinal preparations.

SUMMARY OF THE INVENTION

The general purpose of the stovetop extraction apparatus for rendering infused lipids for ingestion, described subsequently in greater detail, is to provide a stovetop extraction apparatus for rendering infused lipids for ingestion which has many novel features that result in a stovetop extraction apparatus for rendering infused lipids for ingestion which is not anticipated, rendered obvious, suggested, or even implied by prior art, either alone or in combination thereof.

The present stovetop extraction apparatus and accompanying method for rendering infused lipids for ingestion has been devised to provide an efficient and expedient means of effecting lipophilic extraction of lipophilic substances from a desired substrate in the home or kitchen, thereby to render infused lipids for use in subsequent culinary or medicinal preparations.

The present stovetop extraction apparatus for rendering infused lipids for ingestion has been devised for use extracting cannabinoids to produce edibles in the home, whereby medicinal and recreational use of fat soluble active ingredients extractable from a cannabis substrate are producible. However, the present apparatus is usable to effect extraction of any lipophilic substance from a known substrate wherein lipophilic substances are desirously derived, as desired.

The present stovetop extraction apparatus for rendering infused lipids for ingestion effects efficient extraction of lipophilic substances from a desired substrate by passing lipid droplets over said substrate by action of steam forced along a pressure gradient, whereby a concentration gradient is maintained to diffuse lipophilic substances from the substrate into lipids continuously introduced over the substrate. Because the pressure gradient effected by action of producible steam continuously conveys lipid droplets over the substrate, and thence into condensate disposed in an upper compartment removed from the substrate, a concentration gradient is maintained at the interface between lipid and substrate whereby lipophilic substances are continually diffused from the substrate into lipids freshly conveyed over the substrate. Thus maximized lipophilic extraction is enabled and maintained.

Condensate and infused lipids are pourable as emulsion from the upper compartment for cooling and subsequent separation, as will be described herein, whereby rendered lipids infused with lipophilic substances are producible for use in subsequent culinary and medicinal preparations, as desired.

It is important to note that steam producible in a base compartment, wherein fats have likewise been prepared, is produced as saturated steam, whereby temperature of the emulsion is maintained at the boiling point of water. As steam is generated, the increased pressure interior to the base compartment drives steam and lipid droplets through an upper receptacle of an insertable portion, wherein substrate is positional, to condense in the upper compartment for collection of emulsion with infused lipids therein. Thus a pressure gradient is formed, forcing emulsion from the base compartment into the upper compartment wherein condensate is collectable. Lipophilic substances are thus continuously extractable from substrate until all water is boiled. Temperature is thus maintained at the boiling point of water, whereby lipids remain liquid but do not boil, and any fat soluble compounds, materials, or substances extracted from the substrate are maintained intact and undenatured.

The present stovetop extraction apparatus for rendering infused lipids for ingestion, therefore, includes a base compartment having an open top end connectable to a lowermost end of an upper compartment. An insertable portion is dipositional seated at the open top end of the base compartment for sealable engagement in position underlying a porous boundary disposed transversely sectioning the upper compartment proximal the lowermost end.

The insertable portion includes an upper receptacle delimited within a raised perimeter. A screen portion transversely sections the upper receptacle form a basal portion. A downspout is disposed projected downward form the basal portion for position extended into the base compartment when the insertable portion is seated in the base compartment open top end.

A space is thus maintained between the screen portion of the insertable portion and the porous boundary of the upper compartment when said insertable portion is positioned in the open top end of the base compartment and the upper compartment is attached to the base compartment. Substrate additional to the upper receptacle, therefore, is maintainable between the base compartment and the upper compartment.

A flange, disposed circumferentially upon an upper rim of the insertable portion raised perimeter, overlies the upper rim of the base compartment and sealably engages against a seal member disposed annually surrounding the porous boundary of the upper compartment. The basal portion of the insertable portion thus effectively encloses the base compartment open top end, except for passage enabled through the downspout, through the screen portion, through the upper receptacle, for subsequent passage into the upper compartment through the porous boundary disposed proximal the lowermost end.

An internal chamber is disposed sectioned within the upper compartment, said internal chamber disposed open ended overlying the porous boundary. The internal chamber is connected to an elongate column disposed perpendicularly into the upper compartment. The column includes at least one aperture disposed proximally apically thereupon, whereby the internal chamber is disposed in open communication with the porous boundary, the elongate column, and the upper compartment by means of the at least one aperture.

A user thus prepares the apparatus effective for lipophilic extraction by addition of butter (or other lipid rich material) into the base compartment. A volume of water (approximately a quarter cup of water in the example embodiment herein set forth) is additional to the base compartment. Substrate is prepared for lipophilic extraction and placed in the upper receptacle of the insertable portion, which insertable portion is thence seated into the open top end of the base compartment previous to attachment of the upper compartment. Heat may then be applied to the base compartment by placing the apparatus upon a stovetop, as desired.

Heat is thus directable into the base compartment wherein the butter (or other source of lipid material) liquefies forming an emulsion with the water. Increased heat effects volatilization of the water, forming saturated steam. Steam, thus produced, exerts positive pressure interior to the base compartment whereby steam and lipid droplets are borne up the downspout of the insertable portion through the screen portion to contact the substrate disposed in the upper receptacle. Concentration of lipophilic substances interior to the substrate enables diffusion of said lipophilic substances into lipid droplets borne by steam across the pressure gradient. The pressure gradient is maintained by subsequent heating action at the base compartment, whereby additional steam is produced, and lipid droplets (now infused with lipophilic substances diffused from the substrate) and saturated steam are forced through the porous boundary into the internal chamber. The pressure gradient is maintained, and steam and infused lipids are forced up the elongate column, which is narrow relative the cavity formed by the internal chamber, whereby said steam and lipids are forced out the at least one aperture disposed proximally apically upon the elongate column, whereat expansion and cooling effects condensation of the steam into the upper chamber. Emulsion is thus collected with the condensate in the upper chamber, wherein infused lipids remain.

A concentration gradient is maintained at the interface between the substrate and the lipids by action of steam venting through the apparatus, bearing lipid droplets over the substrate for collection in the upper chamber removed from said substrate. Thus maximum extraction is enabled by maintaining the concentration gradient at interface between substrate and lipid droplets.

When boiling of water ceases, and super heating of steam initiates, a user simply removes the apparatus from the heat source. Observation of the apparatus during use enables a user to perceive the moment when water ceases boiling. Temperature within the apparatus therefore is at a maximum in the base compartment, and is maintained only at the boiling point of water (100° C.). Temperature in the upper receptacle, wherein lipophilic extraction occurs, is thus maintained below the boiling point of fats, oils, and lipids in general, whereby lipophilic substances are solved into said lipids borne in the liquid phase. Agitation of steam effects transfer of lipids as droplets whereby surface area of the lipid is increased and extraction of lipophilic substances from the substrate is maximized.

Once removed from heat, liquid emulsion containing infused lipids is pourable into a separate container as desired and cooled above the freezing point of water. Once fats have solidified, liquid water is readily separated by pouring leaving rendered lipids infused with lipophilic substances for culinary or medicinal preparation, as desired. The present apparatus and method of rendering infused lipids for ingestion thus enables efficient extraction of lipophilic substances from a desired substrate in the home or kitchen, upon a stovetop, to produce high concentration infused lipids for subsequent use, as desired.

It is further contemplated as part of this invention that prepackaged porous cartridges, fittable into the upper receptacle, are provided, whereby known volumes of prepackaged substrate are selectable for use with a corresponding quantity of fats (measurable by cutting sticks of butter, for example, or by volume or weight of lipids) to render specific concentrations of infused lipids for use in culinary and medicinal preparations. Moreover, particular substrates are thereby made selectable for use, as desired or preferred, prepackaged and prepared at known volumes to effect desired concentrations of products.

Thus has been broadly outlined the more important features of the present stovetop extraction apparatus and method for rendering infused lipids for ingestion so that the detailed description thereof that follows may be better understood and in order that the present contribution to the art may be better appreciated.

Objects of the present stovetop extraction apparatus and method for rendering infused lipids for ingestion, along with various novel features that characterize the invention are particularly pointed out in the claims forming a part of this disclosure. For better understanding of the stovetop extraction apparatus for rendering infused lipids for ingestion, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
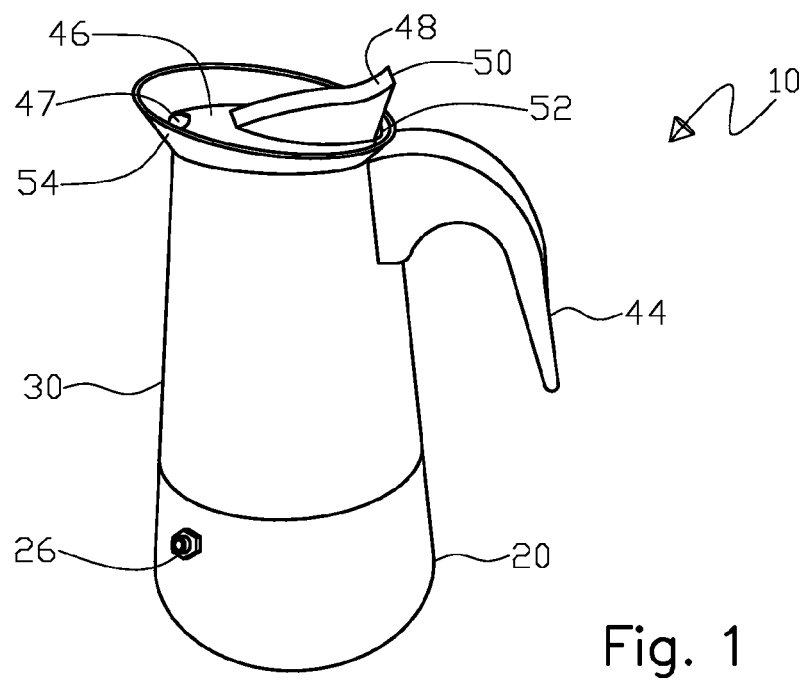
FIG. 1 is an isometric view of an example embodiment disposed with an upper compartment attached to a base compartment.
Figure 2:
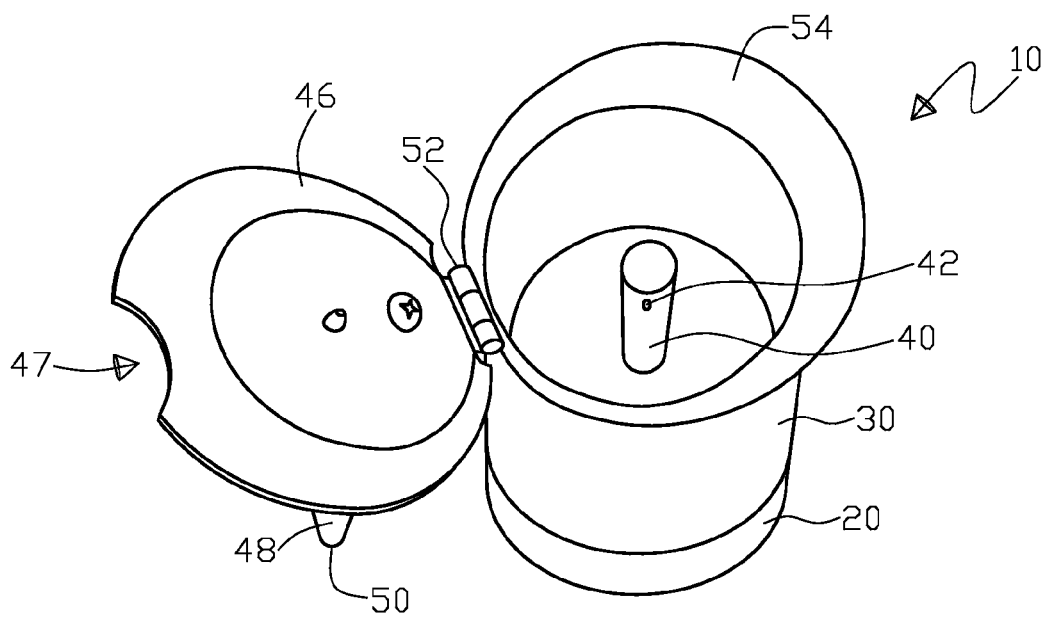
FIG. 2 is an elevated isometric view of an example embodiment having the upper compartment attached to the base compartment and a hinged lid disposed in an open position.
Figure 3:
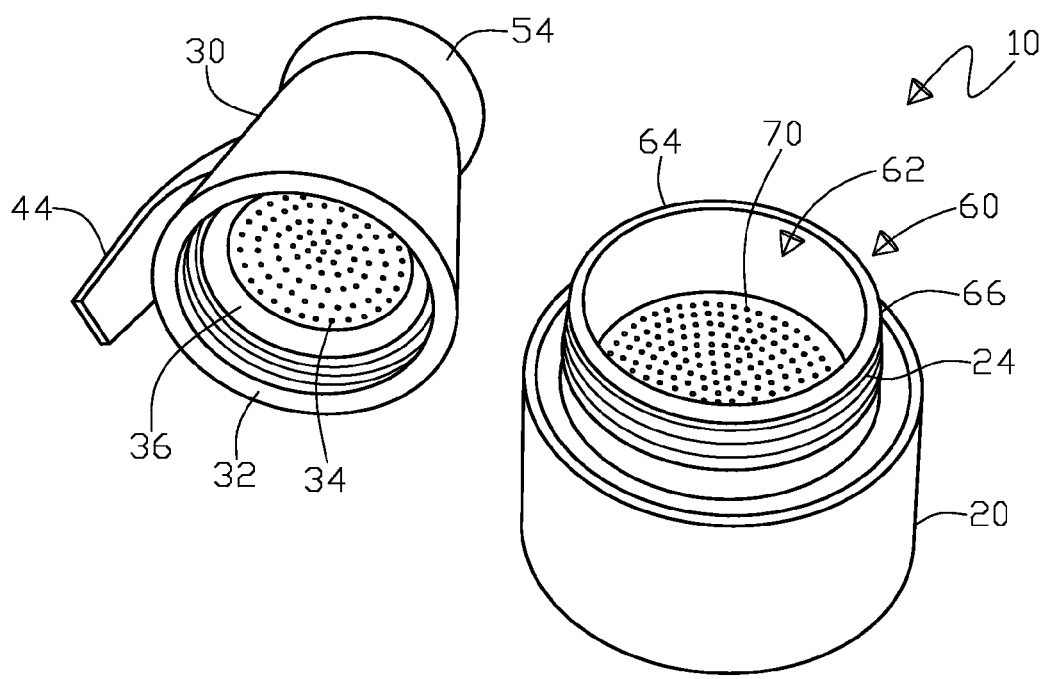
FIG. 3 is an isometric view of an example embodiment having the upper compartment detached from the base compartment whereby a porous boundary, disposed transversely sectioning the upper compartment proximal a lowermost end of the upper compartment, and a screen portion of an insertable portion, are visible. A substrate is thus positional for lipophilic extraction between said porous boundary and said screen portion.
Figure 4:
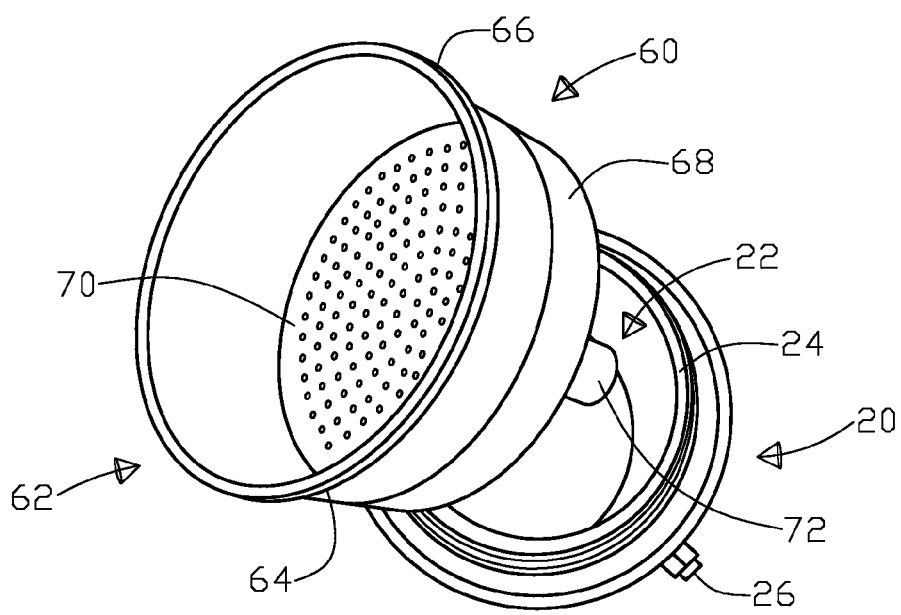
FIG. 4 is an elevated view of an example embodiment of a base compartment, said base compartment having an open top end in which is positional an insertable portion.
Figure 5:
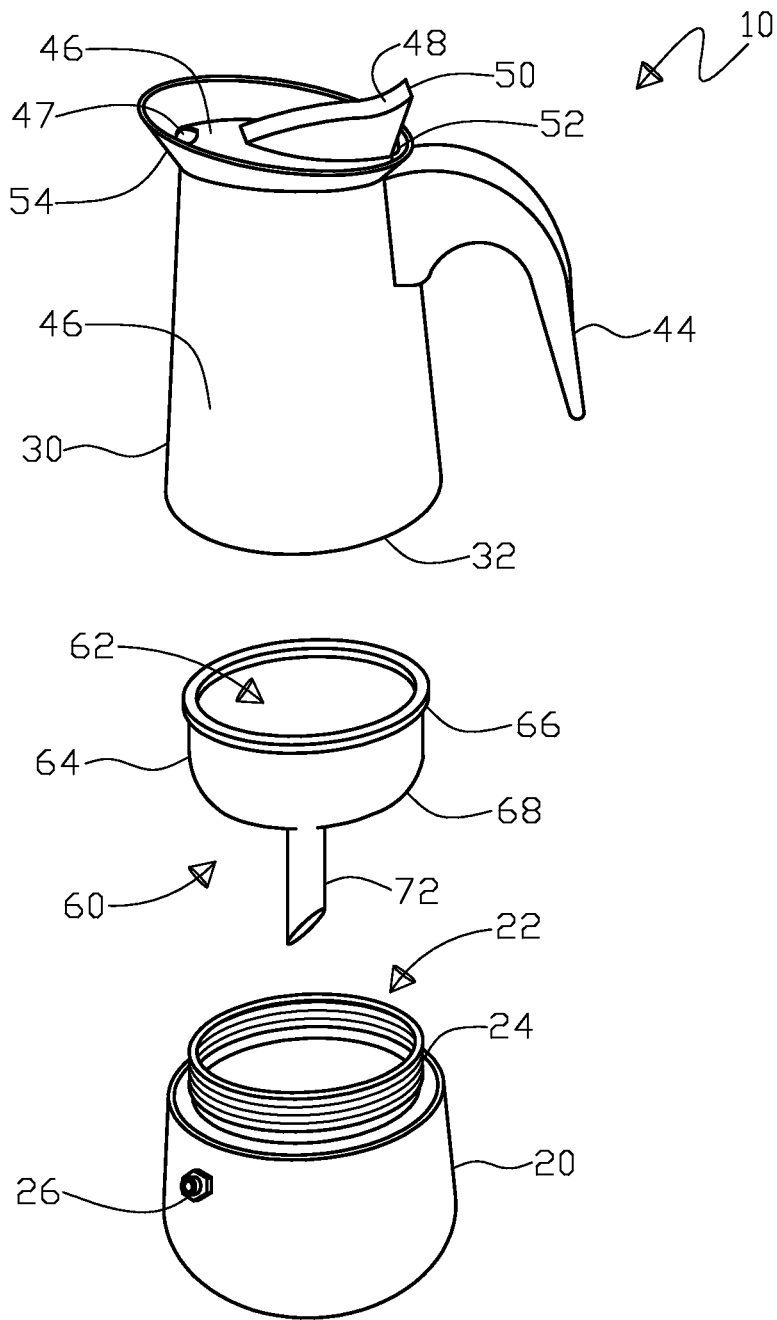
FIG. 5 is a side exploded view of an example embodiment.
Figure 6:
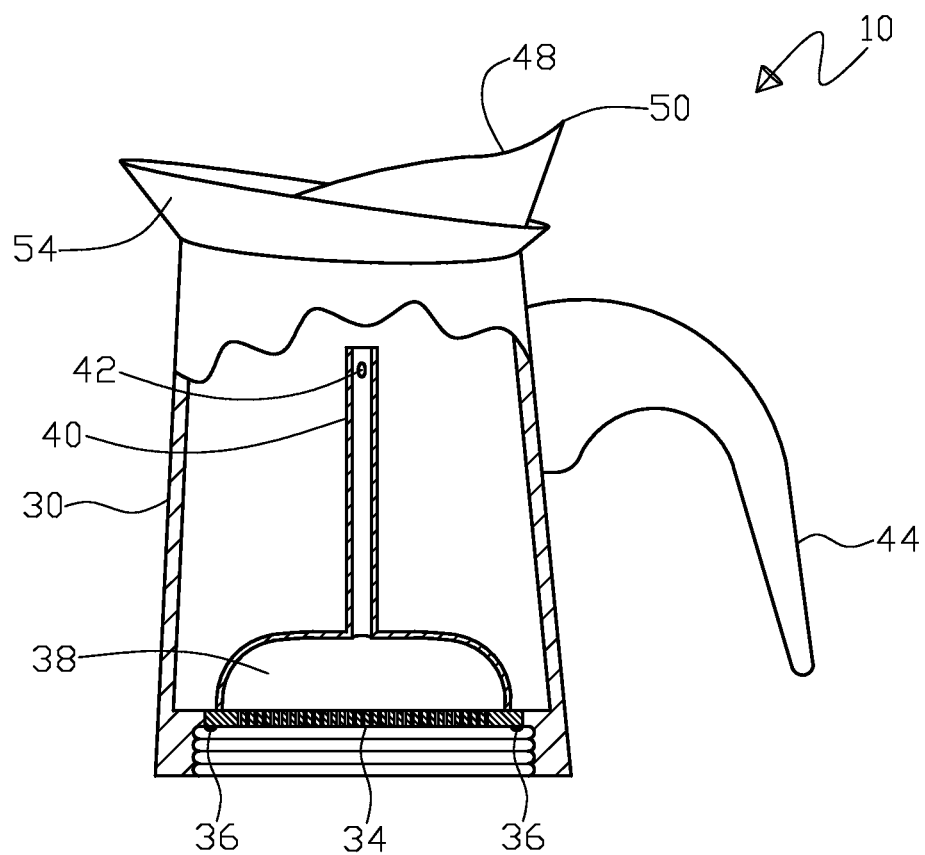
FIG. 6 is a longitudinal section view of an example embodiment having the upper compartment detached from the base compartment.
Figure 6:
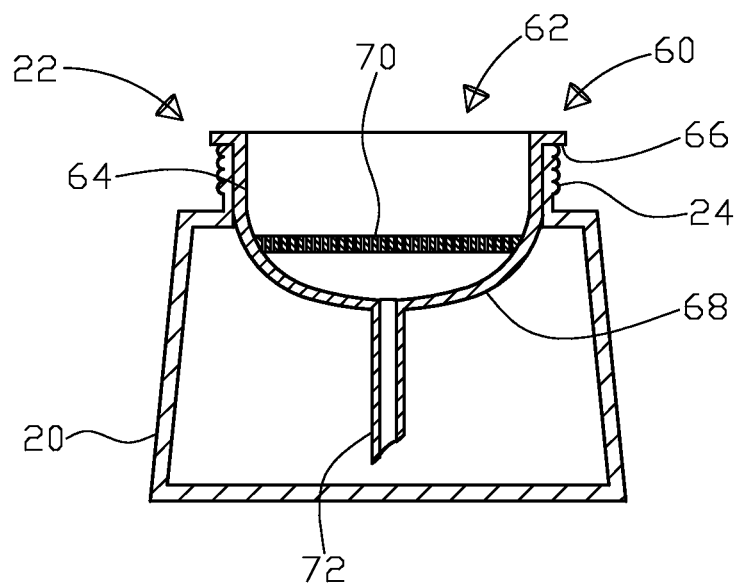
Figure 7:
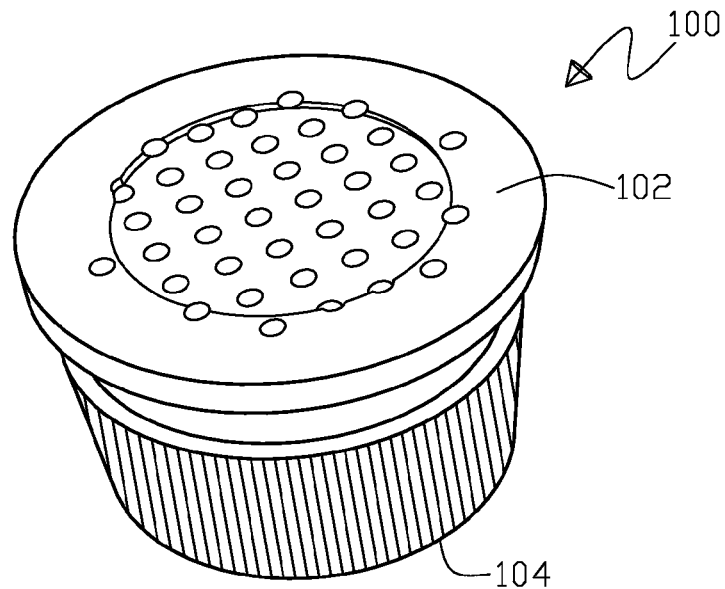
FIG. 7 is an isometric view of an example embodiment of a prepackaged porous cartridge.
Figure 8:
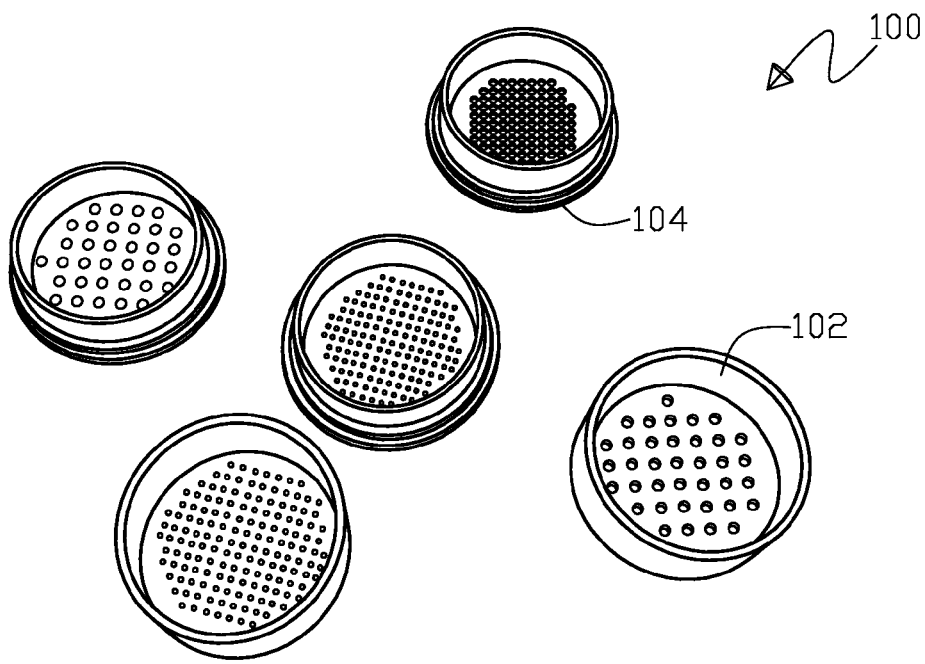
FIG. 8 is an elevated view of example embodiments of porous tops and porous bottoms usable to comprise said prepackaged porous cartridge.
Figure 9:
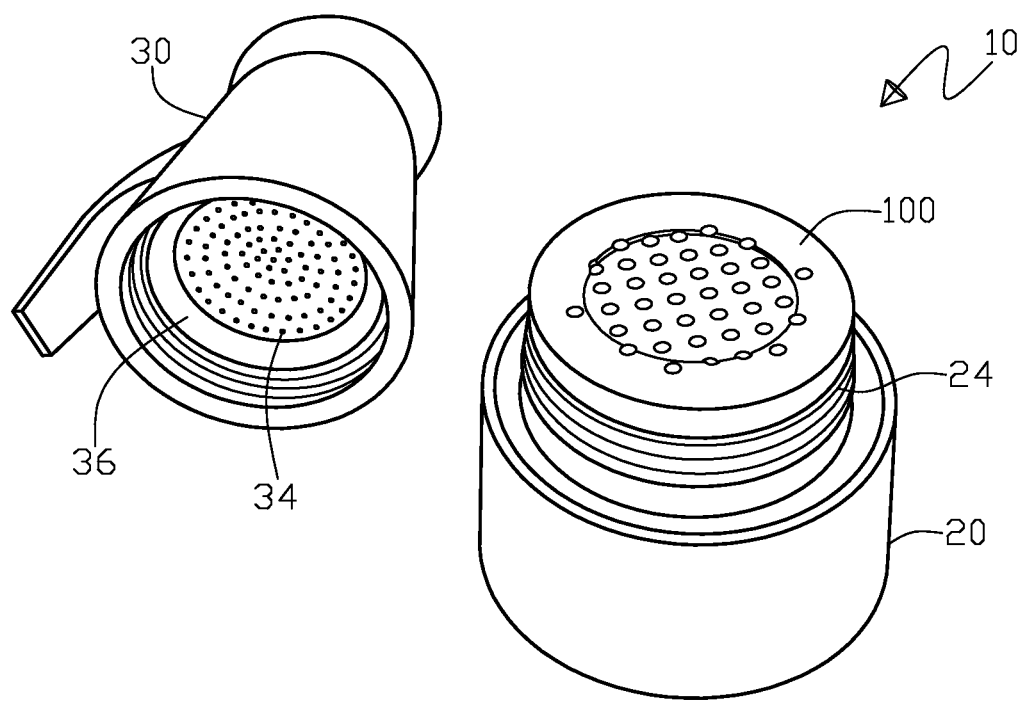
FIG. 9 is an isometric view of an example embodiment having a porous prepackaged cartridge fitted into the insertable portion.
Figure 10:
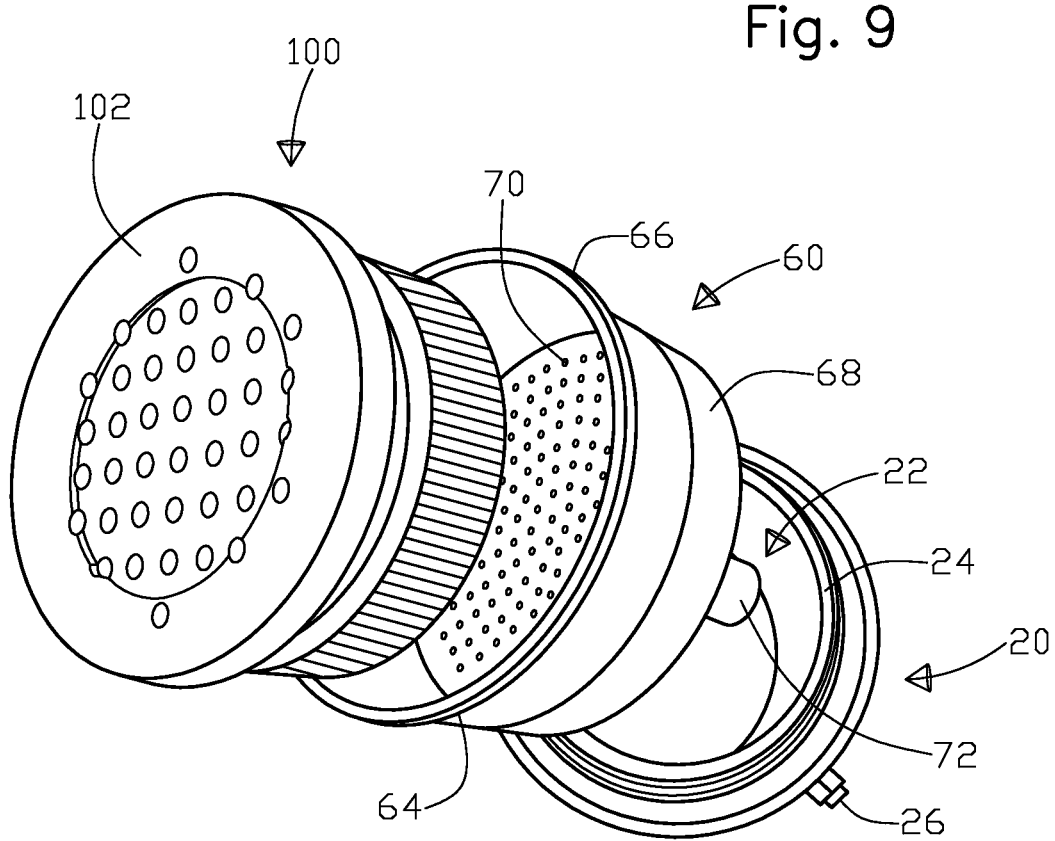
FIG. 10 is an exploded view of an example embodiment illustrating prepackaged porous cartridge fittable into the insertable portion dispositional into the open top end of the base compartment.

With reference now to the drawings, and in particular FIGS. 1 through 10 thereof, example of the instant stovetop extraction apparatus for rendering infused lipids for ingestion employing the principles and concepts of the present stovetop extraction apparatus for rendering infused lipids for ingestion and generally designated by the reference number 10 will be described.

Referring to FIGS. 1 through 10 a preferred embodiment of the present stovetop extraction apparatus for rendering infused lipids for ingestion 10 is illustrated.

The present stovetop extraction apparatus for rendering infused lipids for ingestion 10 has been devised to enable efficient and expedient stovetop extraction of lipophilic substances from a substrate in the home or kitchen. The term "substrate", as used herein throughout, is taken to include any material from which lipophilic substances may be extracted by passing an emulsion of lipids and saturated steam thereover, and may include animal and plant derived products, vegetative material or matter, or other substrates comprising at least in part some lipophilic substance extractable therefrom in the manner herein described.

The term "lipophilic substance", as used herein throughout, is taken broadly to include any molecular arrangement of matter that exhibits lipophilicity, is fat soluble, and thus extractable from a corresponding substrate by passage of lipids proximal to said substrate across a concentration gradient.

The term "lipophilic extraction", as used herein throughout, is taken to include the process of solving lipophilic substances into lipids by passage of said lipids proximal to said substrates in saturated and superheated steam whereby a concentration gradient effects diffusion of lipophilic substances into said lipids.

In an example embodiment herein presented, the instant stovetop extraction apparatus for rendering infused lipids for ingestion 10 is contemplated for use in extracting cannabinoids, whereby infused butter products, suitable for use in creating and baking edible products infused with said cannabinoids, is readily producible. However additional substrates are usable with the present device 10 to effect lipophilic extraction therein.

The present stovetop extraction apparatus for rendering infused lipids for ingestion 10, therefore, enables production of steam in a base compartment 20 whereby lipids derived from butter, ghee, and other prepared vegetable or animal fats, is driven over a pressure gradient across a substrate to effect lipophilic extraction from the substrate. The pressure gradient is extended up an elongate column 40 through which the saturated steam and lipid emulsion pass to condense in an upper compartment 30 by means of expansion and cooling action of said steam through at least one aperture 42 disposed proximally apically atop the column 40. Emulsion of water and infused lipids is then drainable for cooling above the freezing temperature of water, whereby the infused lipids are separable from the water, which water is readily poured from a solidified lipid base. Thus rendered lipids, infused with concentrations of fat soluble substances, are readily producible in the home for use in subsequent culinary preparations, or for preparations of medicines, or other products devised for ingestion or use upon the human body.

The stovetop extraction apparatus for rendering infused lipids for ingestion 10, therefore, includes a base compartment 20 having an open top end 22. A pressure release valve 26 is disposed proximal the open top end 22 whereby superheated steam may escape if positive pressure within the base compartment 20 exceeds a maximum safe operating pressure. A threaded, upper rim 24 is disposed around the open top end 22 for releasable engagement with a lowermost end 32 of an upper compartment 30, as will be described subsequently.

The upper compartment 30 is threadably attachable atop the base compartment 20 at the upper rim 24 by action of a lowermost end 32 disposed to engage over the upper rim 24. The upper rim 24 of the base compartment is thus securable into the lowermost end 32 of the upper compartment 30.

A porous boundary 34 is disposed upon the upper compartment 30 inset proximal the lowermost end 32, said porous boundary 34 transversely disposed to section off the upper compartment 30 proximal the lowermost end 32. The porous boundary 34 positions overlying the open top end 22 of the base compartment 20 when the base compartment 20 is attached to the lowermost end 32 of the upper compartment 30. An annular seal member 36, disposed circumferentially around the porous boundary 34 interior to the lowermost end 32, compressively engages against the upper rim 24 of the base compartment 20 to sealably engage the base compartment 20 in open communication with the upper compartment 30 through the porous boundary 34.

An internal chamber 38 is disposed above the porous boundary 34 and sectioned inside the upper compartment 30, said internal chamber 38 disposed in open communication with an elongate column 40 disposed perpendicularly into the upper compartment 30. The elongate column 40 has at least one aperture 42 disposed proximally apically thereupon.

For wielding the apparatus 10, an insulated handle 44 is disposed exteriorly upon the upper compartment 30. The insulated handle 44 enables a user to remove the apparatus 10 from a heat source and further enables pouring of the collected emulsion from the upper compartment 30 for separation of water and infused lipids, as will be subsequently described.

A hinged lid 46 is disposed atop the upper compartment 30. The hinged lid 46 includes an insulated purchase point 48 disposed exteriorly thereon for manual action applied to move said lid 46 between an open position and a closed position. A user grasping the insulated handle 44 is enabled manual action at the insulated purchase point 48 by extension of said user's thumb. The purchase point 48 includes a curved apex 50 disposed proximally overlying a pivot point 52 whereby manual pressure applied to the purchase point 48 curved apex 50 effects movement of the hinged lid 46 at the pivot point 52 between the open and closed positions. A notch 47 is disposed upon the lid to prevent sealable contact with the upper compartment when the lid 46 is disposed in the closed position, whereby steam and heat may readily vent without forcible action against the hinged lid 46.

A flared rim 54 is disposed atop the upper compartment 30, said flared rim 54 disposed to direct fluids poured from the upper compartment 30 when the hinged lid 46 is disposed in the open position to controllably deliver said fluids from the upper compartment 30 into an extant container, or elsewhere, as desired. Emulsion of water and infused lipids collected in the upper compartment 30 is thus readily pourable into an extant container for cooling whereby liquid water is pourable from solidified infused rendered fats disposed in said extant container.

An insertable portion 60 is dispositional removably into the open top end 22 of the base compartment 20 and therein sealably engagable against the seal member 36 circumferentially bounding the porous boundary 34 of the upper compartment 30, when said upper compartment 30 is attached to the base compartment 20. The insertable portion 60 is devised to seat substrate therein for lipophilic extraction, and forms a porous enclosure when the base compartment 20 is attached to the upper compartment 30 in the manner herein described.

The insertable portion 60, therefore, includes an upper receptacle 62 having a raised perimeter 64 bounding a screen portion 70, said screen portion 70 disposed transversely overlying a basal portion 68. A flange 66 is disposed upon the raised perimeter 64, said flange 66 annularly disposed overhanging outward from the upper receptacle 62 in a plane parallel the screen portion 70. The flange 66 is positional to seat the insertable portion 60 upon the open top end 22 of the base compartment 20 when the insertable portion 60 is disposed into the base compartment 20 open top end 22, said flange 66 thereat dispositional for sealable contact with the seal member 36 when the upper compartment 30 is subsequently attached to the base compartment 20.

A downspout 72 is disposed basally projecting from the upper receptacle 62 basal portion 68, said downspout 72 having a hollow cavity disposed in open communication into the basal portion 68 underlying the screen portion 70. When the insertable portion 60 is placed in position in the open top end 22 of the base compartment 20, the downspout 72 is extended into the base compartment 20.

Thus, when water and butter, for example, or other source of lipids, is additional to the base compartment 20 and heat is then applied to the base compartment 20, as when the apparatus 10 is placed upon a stovetop, water subsequently vaporized is forced by positive pressure to convey lipid droplets up the downspout 72, through the screen portion 70, over substrate disposed in the upper receptacle 62, through the porous boundary 34 transversely sectioning the upper compartment 30, up the elongate column 40, for delivery through the at least one aperture 42 into the upper compartment 30 whereat said vapor is condensable for collection of emulsion therein.

The pressure gradient between the base compartment 20 and the upper compartment 30 effects continuous delivery of lipids conveyed in saturated steam for maximum extraction of lipophilic substances from the substrate as lipids are continuously delivered from the base compartment 20 over the substrate, and into the upper compartment 30, whereby equilibrium is preventable within the upper receptacle 62 and lipophilic substances comprised in the substrate are moved along a maintained concentration gradient from the substrate and into the lipids freshly conveyed in the saturated steam.

Temperature within the base compartment 20 is maintained at the boiling point of water when said water boils, and therefore the temperature remains below the boiling point of lipids therein, whereby saturated steam is producible and lipids, liquefied in the base compartment 20, are thereby deliverable in saturated steam through the insertable portion 60 to effect lipophilic extraction therein. Once water has boiled off from the base compartment 20, superheated steam is preventable as steam has already condensed in the upper compartment 30 whereby a user readily removes the apparatus 10 from the heat source for cooling. A user is alerted to completion of steam delivery through the insertable portion 60 by observation of the apparatus 10 during lipophilic extraction.

Thus, fats and water dispositional interior to the base compartment 20 are heatable atop a stovetop and thereby drivable through the downspout 72 by action of steam producible interior to the base compartment 20, said fats thereby conveyable through the screen portion 70, through the upper receptacle 62 of the insertable portion 60, over any substrate there disposed, through the internal chamber 38, up the column 40, and condensable out the at least one aperture 42 to collect in the upper compartment 30, whereby lipophilic substances are extractable from substrates dispositional in the insertable portion 60 to render infused lipids for subsequent use in culinary and medicinal preparations.

A user may thus readily position substrate collected from a prepared source into the insertable portion 60 for lipophilic extraction of fat soluble substances to effect a maximum extraction potential by use of the present stovetop extraction apparatus for rendering infused lipids for ingestion 10. Additionally, the present invention 10 is further contemplated to include a prepackaged porous cartridge 100 fittable into the insertable portion 60, said cartridge 100 prepackaged with a known or desired quantity of substrate, or a particular substrate, as desired, selectable for action of lipophilic extraction of fat soluble compounds upon a stovetop.

The prepackaged porous cartridge 100 includes a porous top 102 and a porous bottom 104 between which a known volume of substrate is prepackaged. The cartridge 100 is thus seatable nicely into the upper receptacle 62 of the insertable portion 60 and thereat sealably engaged for lipophilic extraction of substrate prepackaged therein. The prepackaged cartridge 100 enables preparation of known quantities of substrate with ranges of known concentrations of lipophilic substances whereby a known concentration of infused lipids is producible for use, as desired.

What is claimed is:

1. A stovetop extraction apparatus for rendering infused lipids for ingestion comprising:
    a base compartment attachable to an upper compartment;
    an insertable portion seatable into the base compartment in position between said base compartment and said upper compartment when said base and upper compartments are attached together;
    an internal chamber disposed in the upper compartment in open communication with a column disposed projecting into the upper compartment;
    an open top end;
    a pressure release valve; and
    a threaded upper rim disposed around the open top end, said threaded upper rim connectable to the upper compartment;
    wherein lipids and water dispositional interior to the base compartment are heatable upon a stovetop, said lipids thereby conveyable, by action of steam producible interior to said base compartment, from the base compartment through the insertable portion, into the internal chamber, up the column, and thereby condensable in the upper compartment for collection therein, whereby substrates dispositional interior to the insertable portion are subject to extraction of lipophilic substances therefrom and infused lipids are thereby rendered collectable in the upper compartment for use in subsequent culinary or medicinal preparations and the insertable portion seats into the open top end for sealable engagement with the upper compartment when said upper compartment and base compartment are together attached.

2. The stovetop extraction apparatus for rendering infused lipids for ingestion of claim 1 wherein the upper compartment further comprises:
    a lowermost end threadably connectable to the threaded upper rim of the base compartment;
    a porous boundary disposed transversely proximal to the lowermost end, said porous boundary sectioning off the upper compartment from the lowermost end; and
    a seal member disposed circumferentially bounding the porous boundary in position to engage against the insertable portion when the open top end of the base compartment is threadably connected to the upper compartment lowermost end;
    wherein emulsion of lipids and water is conveyable along a pressure gradient by action of steam through the insertable portion, the porous boundary, and into the internal chamber whereby said emulsion is condensable through the column for collection interior to the upper compartment.

3. The stovetop extraction apparatus for rendering infused lipids for ingestion of claim 2 wherein the insertable portion further comprises:
    a raised perimeter;
    a flange disposed atop the raised perimeter in position to support the insertable portion seated in the open top end of the base compartment, said flange disposed to engage against the seal member of the upper compartment when the insertable portion is seated in the base compartment open top end;
    a basal portion disposed basally enclosing the raised perimeter;
    a screen portion disposed transversely sectioning the insertable portion above the basal portion; and
    a downspout disposed projected from the basal portion, said downspout enabling passage of emulsion of lipids and water from the base compartment through the screen portion and through the insertable portion;
    wherein substrate positional atop the screen portion is enclosable within the insertable member between the screen portion and the porous boundary of the upper compartment, when said upper compartment is attached to the base compartment, whereby said substrate is maintainable in position subject to lipophilic extraction of lipophilic substances therefrom when heat is applied to the base compartment and lipids and water therein are conveyed through the downspout over said substrate for condensable collection in the upper compartment.

4. The stovetop extraction apparatus for rendering infused lipids for ingestion of claim 3 wherein the upper compartment further comprises a hinged lid dispositional between an open position and a closed position, said hinged lid having an insulated purchase point for manual engagement by a user.

5. The stovetop extraction apparatus for rendering infused lipids for ingestion of claim 4 wherein the upper compartment further comprises an insulated handle disposed exteriorly for manual grasping by a user, wherein grasping of the handle positions the hand of the user appropriate for manipulation of the insulated purchase point.

6. The stovetop extraction apparatus for rendering infused lipids for ingestion of claim 5 further comprising a prepackaged porous cartridge fittable into the insertable portion wherein prepackaged substrate of known quantity is expediently positional for lipophilic extraction of fat soluble substances.

7. A stovetop extraction apparatus for rendering infused lipids for ingestion comprising:
    a base compartment comprising:
        an open top end;
        a pressure release valve disposed proximal the open top end;
        a threaded, upper rim disposed around the open top end;
    an upper compartment threadably attachable atop the base compartment at the upper rim, said upper compartment comprising:
        a threaded lowermost end;
        a porous boundary disposed proximal the lowermost end, said porous boundary transversely disposed to section off the upper compartment proximal the lowermost end;
        an internal chamber disposed open ended above the porous boundary inside the upper compartment, said internal chamber disposed in open communication with an elongate column disposed upwardly into the upper compartment, said column having at least one aperture disposed proximally apically thereupon;
        a seal member disposed circumferentially around the porous boundary interior to the lowermost end;
        an insulated handle disposed exteriorly upon the upper compartment;

a hinged lid disposed atop the upper compartment, said hinged lid having an insulated purchase point for manual action applied to move said lid between an open position and a closed position;

a flared rim disposed atop the upper compartment, said flared rim disposed to controllably direct fluids poured from the upper compartment when the hinged lid is disposed in the open position;

an insertable portion dispositional removably into the open top end of the base compartment, therein sealably engagable against the seal member circumferentially bounding the porous boundary of the upper compartment when said upper compartment is attached to the base compartment, said insertable portion comprising:

an upper receptacle having:
　a raised perimeter;
　a flange disposed upon the raised perimeter, said flange seatable atop the upper rim of the base compartment, said flange disposed for sealable contact with the seal member when the upper compartment is attached to the base compartment;
　a basal portion;
　a screen portion transversely disposed in the upper receptacle overlying the basal portion; and
　a downspout disposed basally projecting from the upper receptacle basal portion, said downspout having a hollow cavity disposed in open communication into the basal portion underlying the screen portion;

wherein fats and water dispositional interior to the base compartment are heatable atop a stovetop and thereby drivable through the downspout by action of steam interior to the base compartment, said fats thereby conveyable through the screen portion, through the upper receptacle of the insertable portion, through the internal chamber, up the column, and condensable out the at least one aperture to collect in the upper compartment, whereby lipophilic substances are extractable from substrates dispositional in the insertable portion to render infused fats for subsequent use in culinary or medicinal preparations.

8. The stovetop extraction apparatus for rendering infused lipids for ingestion of claim 7 further comprising a prepackaged porous cartridge fittable into the insertable portion, said cartridge prepackaged with a quantity of substrate selected for action of lipophilic extraction of fat soluble compounds upon a stovetop.

* * * * *